United States Patent [19]
Kapur et al.

[11] Patent Number: 6,134,622
[45] Date of Patent: Oct. 17, 2000

[54] DUAL MODE BUS BRIDGE FOR COMPUTER SYSTEM

[75] Inventors: Suvansh Kapur, Portland; Kevin Koschoreck, Tigard; Srinand Venkatesan; D. Michael Bell, both of Beaverton, all of Oreg.

[73] Assignee: Intel Corporation, Santa Clara, Calif.

[21] Appl. No.: 09/013,777

[22] Filed: Jan. 26, 1998

Related U.S. Application Data

[63] Continuation-in-part of application No. 08/579,297, Dec. 27, 1995, Pat. No. 5,828,865.

[51] Int. Cl.[7] .................................................. G06F 13/38
[52] U.S. Cl. ........................ 710/128; 710/126; 710/127; 710/129; 710/130
[58] Field of Search ..................................... 710/126, 127, 710/128, 129, 130; 395/500

[56] References Cited

U.S. PATENT DOCUMENTS

| | | |
|---|---|---|
| 5,255,376 | 10/1993 | Frank . |
| 5,396,602 | 3/1995 | Amini et al. . |
| 5,450,551 | 9/1995 | Amini et al. . |
| 5,499,346 | 3/1996 | Amini et al. . |
| 5,522,050 | 5/1996 | Amini et al. . |
| 5,548,730 | 8/1996 | Young et al. . |
| 5,564,026 | 10/1996 | Amini et al. . |
| 5,568,619 | 10/1996 | Blackledge et al. . |
| 5,581,714 | 12/1996 | Amini et al. . |
| 5,590,287 | 12/1996 | Zeller et al. .............................. 395/500 |
| 5,592,631 | 1/1997 | Kelly et al. . |
| 5,596,725 | 1/1997 | Ferguson et al. . |
| 5,603,051 | 2/1997 | Ezzet . |
| 5,651,137 | 7/1997 | MacWilliams et al. . |
| 5,682,484 | 10/1997 | Lambrecht . |
| 5,734,850 | 3/1998 | Kenny et al. . |
| 5,768,546 | 6/1998 | Kwon . |
| 5,771,360 | 6/1998 | Gulick . |
| 5,892,964 | 4/1999 | Horan et al. .............................. 712/33 |

Primary Examiner—Ayaz R. Sheikh
Assistant Examiner—Rupal D. Dharia
Attorney, Agent, or Firm—Antonelli, Terry, Stout & Kraus, LLP

[57] ABSTRACT

A bus expander bridge is provided for interfacing first and second external buses (such as PCI buses) to a third bus. The bus expander bridge is configurable in either an independent mode in which the first and second external buses operate independently and a combined mode in which the first and second external buses are combined to create a single bus. The bus expander bridge includes a first set of data queues for routing data between the first external bus and the third bus, and a second set of data queues for routing data between the second external bus and the third bus. The bus expander bridge also includes a controller coupled to the first and second sets of data queues and operating the first and second sets of data queues in parallel for the independent mode. The controller routes even addressed data through the first set of data queues and routes odd addressed data through the second set of data queues for the combined mode.

7 Claims, 3 Drawing Sheets

DUAL MODE BUS BRIDGE FOR COMPUTER SYSTEM

CROSS-REFERENCE TO RELATED APPLICATIONS

This application is a continuation-in-part of application Ser. No. 08/579,297 filed on Dec. 27, 1995 now U.S. Pat. No. 5,828,865 and entitled "Dual Mode Bus Bridge For Interfacing A Host Bus And A Personal Computer Interface Bus," hereby incorporated by reference.

BACKGROUND OF THE INVENTION

The invention generally relates to computer bus systems and in particular to a bridge or interface element for interconnecting a host computer bus with an external bus, such as a Peripheral Component Interface (PCI) bus.

PCI bus systems are becoming increasingly popular for use within personal computers, particularly, personal computers configured as file servers. A PCI bus is a high performance, high bandwidth bus configured in accordance with protocols established by the PCI Special Interest Group.

In a typical computer system employing a PCI bus, a PCI-to-host bridge is provided between the PCI bus and a host bus of the computer system. The bridge is provided, in part, to facilitate conversion of data from the PCI format to a format employed by the host bus. Many PCI-to-host bridges are configured to accommodate only a 32-bit PCI bus. Others are configured to accommodate either only a 64-bit PCI bus or only a 32-bit PCI bus. Accordingly, to accommodate more than one PCI bus requires additional PCI-to-host bridges. For many computer systems, particularly file server computer system, numerous PCI buses must be accommodated. The conventional arrangement, wherein one bridge is required for each PCI bus, offers little flexibility. Moreover, many state of the art host buses are highly sensitive to the number of computers, such as bridges, connected to the bus. With such buses the maximum permissible clock rate is often inversely proportional to the number of components connected to the host bus due to the electrical load supplied by each component. Accordingly, the connection of additional bridges to the host bus results in a lowering of the maximum permissible clock rate, thereby lowering the overall performance of the system. As a result, the connection of an additional PCI bridge may lower the maximum permissible clock rate to a level which significantly hinders the performance of the overall computer system.

Accordingly, there is a need for a more flexible technique for interconnecting PCI buses to a host bus without adding additional electrical loads to the host bus.

SUMMARY OF THE INVENTION

According to an embodiment of the present invention, a bus bridge is provided for interfacing first and second buses to a third bus. The bus bridge is configurable in either an independent mode in which the first and second buses operate independently or a combined mode in which the first and second buses are combined to create a single bus.

According to another embodiment of the present invention, the bus bridge includes a first set of data queues for routing data between the first bus and the third bus, and a second set of data queues for routing data between the second bus and the third bus. The bus bridge also includes a controller coupled to the first and second sets of data queues and operating the first and second sets of data queues in parallel for the independent mode. The controller routes even addressed data through the first set of data queues and routes odd addressed data through the second set of data queues for the combined mode.

DETAILED DESCRIPTION

Figure 1:
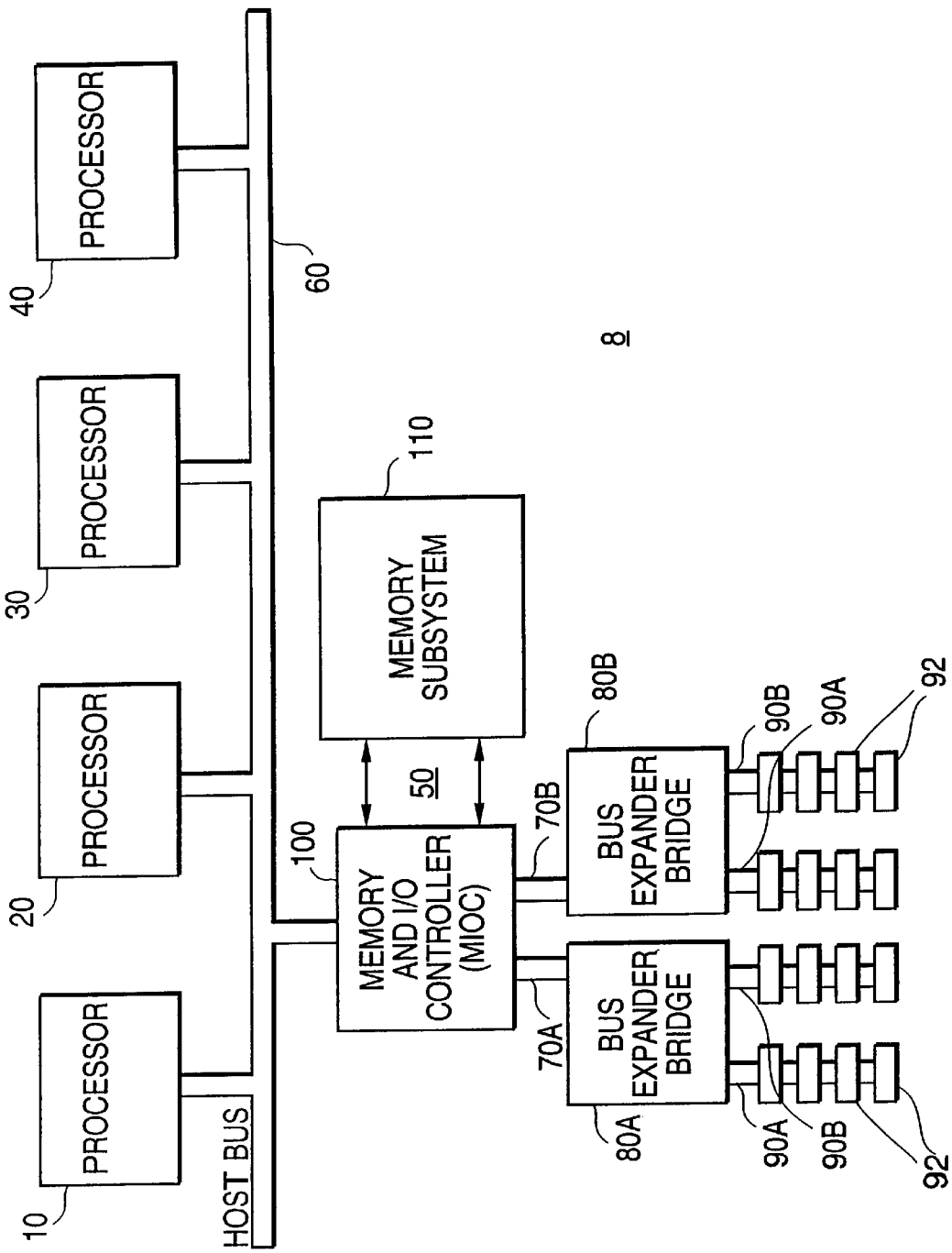
FIG. 1 is a block diagram which illustrates a computer system according to an embodiment of the present invention.

Referring to the figures in which like numerals indicate like elements, FIG. 1 is a block diagram which illustrates a computer system according to an embodiment of the present invention. Computer system 8 includes a plurality of processors, including processors 10, 20, 30 and 40. The processors are connected to a host bus 60 of computer system 8. A memory subsystem 110 is connected to host bus 60 via lines 50, and includes memory, such as dynamic random access memory and associated control logic. Computer system 8 also includes a memory and input/output (I/O) bridge controller (MIOC) 100 connected to host bus 60 for interfacing one or more I/O buses (or other external buses) and memory subsystem 110 to host bus 60. Although MIOC 100 is shown as a single block or component in FIG. 1, the MIOC 100 can alternatively be provided as a separate memory controller and a separate I/O bridge controller.

Computer system 8 also includes a plurality of bus expander bridges 80 connected to MIOC 100 for interfacing one or more external buses to host bus 60. According to the embodiment illustrated in FIG. 1, two bus expander bridges 80A and 80B are connected to MIOC 100 via expander buses 70A and 70B, respectively. Although only two bus expander bridges 80A and 80B are connected to MIOC 100, there may be any number of bus expander bridges 80 (e.g., 80A, 80B, 80C, 80D) connected to MIOC 100.

Each bus expander bridge 80 includes multiple PCI ports wherein each PCI port is provided for connecting and interfacing to a PCI bus. In the embodiment illustrated in FIG. 1, bus expander bridges 80A and 80B each include two PCI ports for accommodating two PCI buses 90A and 90B. Expander buses 70A and 70B and PCI buses 90A and 90B are bi-directional buses. A plurality of PCI expansion slots 92 are connected to each PCI bus 90 to allow one or more PCI devices to be plugged in or connected to each PCI bus 90. A wide variety of PCI devices or adapters may be plugged in to PCI expansion slots 92, such as a PCI compatible hard-disk drive, a graphics card, a tape drive, etc.

According to the present invention, one or more bus expander bridges 80 can be coupled to host bus 60 via MIOC 100. However, MIOC 100 applies only a single electrical load to host bus 60. Therefore, the bus expander bridges 80 of the present invention allow for multiple external buses (e.g., PCI buses) to be connected to host bus 60 without degrading host bus performance because the multiple external buses appear as a single electrical load on host bus 60.

Although expander bridges 80A and 80B according to an embodiment each provide an interface to PCI buses, the expander bridges 80A and 80B of the present invention could alternatively interface to other types of external buses. Therefore, the bus expander bridge 80 of the present invention is therefore not limited to interfacing to PCI buses.

According to an embodiment of the present invention, each bus expander bridge 80 provides two independent 32-bit, 33 MHZ, Rev. 2.1 compliant PCI interfaces. Each PCI interface requires 50 signals for the bus, plus 12 additional arbitration and support signals according to the PCI standard. Each bus expander bridge 80 provides the primary control and data interface between the PCI buses 90A and 90B and the expander buses 70A and 70B. Each bus expander bridge 80 includes PCI ports for accommodating multiple PCI buses as illustrated in FIG. 1. In addition, each bus expander bridge 80 can also be configured to combine multiple PCI buses to provide a single PCI bus having increased bandwidth.

According to an embodiment of the present invention, each bus expander bridge 80 can be configured to provide two independent 32 bit PCI buses (independent 32-bit mode) or alternatively to combine the two 32-bit PCI buses 90A and 90B to obtain a single 64-bit PCI bus (combined 64-bit mode). Therefore, the bus expander bridge 80 of the present invention provides improved flexibility because each bus expander bridge 80 can be configured to accommodate different sized buses.

Each bus expander bridge 80 can be configured in either the independent 32-bit mode or the combined 64-bit mode using a variety of techniques. For example, the bridge 80 can be configured by setting the state of a 64-bit mode pin input to bridge 80 using a jumper, by programming one or more silicon fuses in bridge 80, or by processor 10 initializing bridge 80.

In operation, various transactions flow across computer system 8 including transactions between processor 10 (or other processors) and PCI devices connected to PCI buses 90A and 90B, transactions between processor 10 and memory subsystem 110, and transactions between different PCI devices.

According to an embodiment of the present invention, the bus transactions across host bus 60 and expander buses 70A and 70B are full split transactions and consist of a request packet and a completion packet. There are two types of transactions: a read transaction, and a write transaction. The request packet initiates a transaction. Completion packets are used to return data (only for a read request), to indicate that a transaction has been completed on the destination device, and to reallocate buffer or queue resources.

A packet of information consists of multiple 32-bit words (also known as double words or Dwords). Each packet includes a header that consists of address and control information and can include a data portion. The header of the packet is provided as one or more Dwords that includes the command (read or write), address information, a transaction ID identifying the transaction, routing information, and additional control information. The data portion of a packet can include one or more Dwords of data. A completion packet contains the transaction ID corresponding to the original request, an indication that the transaction was completed, and other control information. A read completion packet also includes the requested data retrieved (if any) in response to the read request. A write completion contains no data but indicates that the write was completed successfully.

Transactions in computer system 8 can be categorized as either inbound transactions or outbound transactions. Inbound transactions are those transactions initiated by a PCI master connected to buses 90A or 90B. For example, a PCI device operating as a PCI master may initiate an inbound read operation to memory sub-system 110. An outbound transaction is a transaction initiated by, for example, processor 10 and directed to a device connected to PCI buses 90A or 90B. For example, an outbound transaction could include a processor read of a hard disk drive connected to one of the PCI expansion slots 92.

Figure 2:
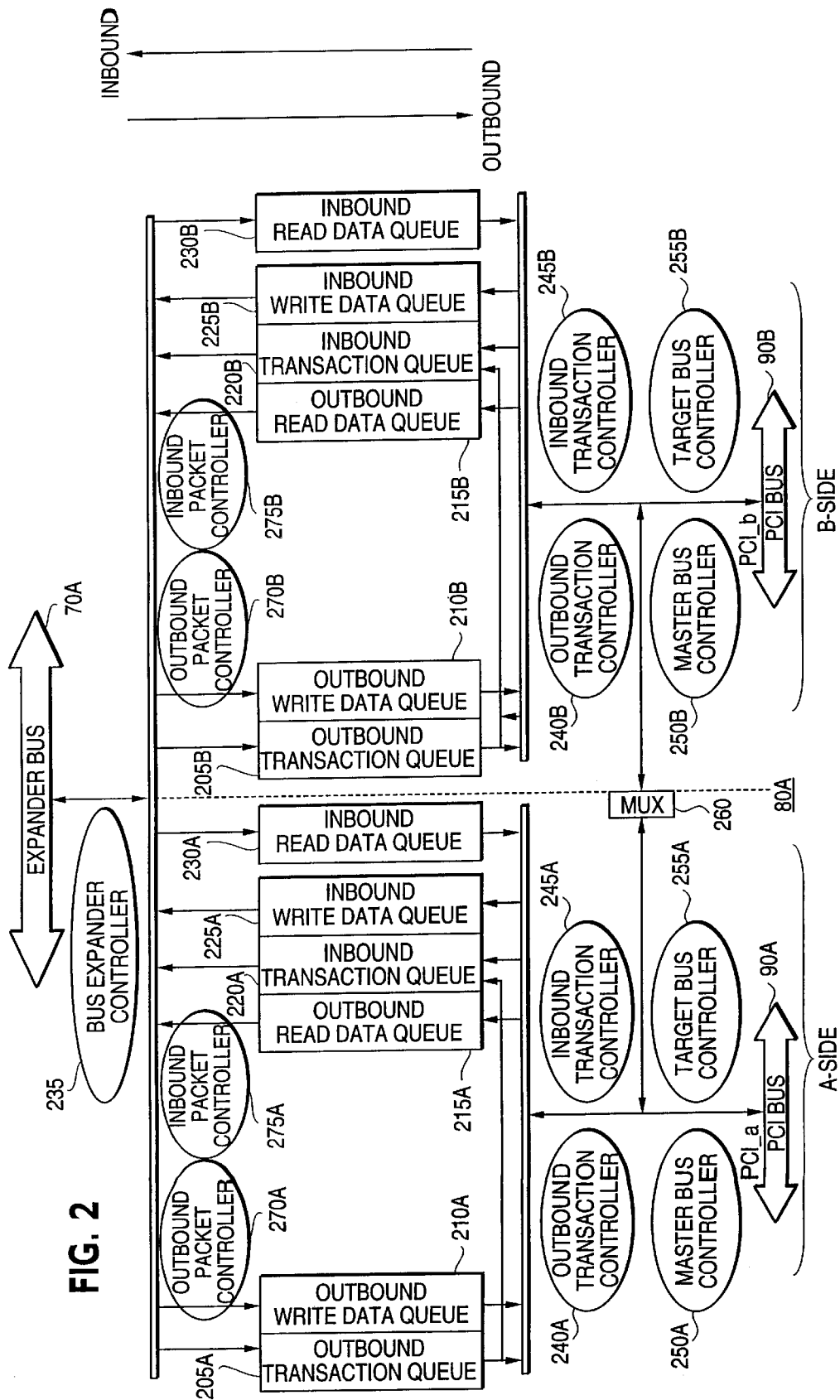
FIG. 2 is a block diagram which illustrates a bus expander bridge according to an embodiment of the present invention.

FIG. 2 is a block diagram which illustrates a bus expander bridge according to an embodiment of the present invention. As shown in FIG. 2, bus expander bridge 80A is connected between expander bus 70A and PCI buses 90A and 90B. Bridge 80A is divided into two substantially identical halves or sides (A-side and B-side) wherein each side services one of the 32-bit PCI buses (90A or 90B) while in the independent 32-bit mode. There is one common expander bus controller 235 that services both sides of bus expander bridge 80A.

The specific elements or components for each side of bus expander bridge 80A will now be briefly described. As noted, each side of bus expander bridge 80A is substantially the same. As illustrated in FIG. 2, corresponding elements on each side include the same identifying numeral. To differentiate A-side and B-side elements of bus expander bridge 80A, the identifying numerals on the A-side end in the letter "A," while the identifying numerals on the B-side end in the letter "B."

Each side of the bus expander bridge 80A includes several queues to store address and control information and data, including:

an outbound transaction queue (OTQ) 205 for storing addresses and control information for outbound read and write requests and inbound read completion packets;

an outbound write data queue (OWDQ) 210 for storing outbound write data;

an outbound read data queue (ORDQ) 215 for storing outbound read data;

an inbound transaction queue (ITQ) 220 for storing addresses and control information for inbound read and write requests and outbound completion packets;

an inbound write data queue (IWDQ) 225 for storing inbound write data; and two inbound read data queues (IRDQ) 230, for storing inbound read data for two different read completions.

As illustrated in FIG. 2, each side of the bus expander bridge 80A also contains six controllers that are responsible for controlling the operation of the queues described above. There is also one expander bus controller 235 in the bridge 80A that is common to both sides. Specifically, each side of bridge 80A includes:

an outbound transaction controller 240 which is responsible for the loading and the unloading of the OTQ 205, the OWDQ 210 and ORDQ 215;

an inbound transaction controller 245, which is responsible for the loading and the unloading of ITQ 220, IRDQ's 230, and IWDQ 225;

a master bus controller 250 which interfaces between the outbound transaction controller 250 and the PCI bus for outbound transactions;

a target bus controller 255 which interfaces between the inbound transaction controller 245 and the PCI bus for inbound transactions;

an outbound packet controller 270 for receiving outbound packets from the expander bus controller 235 and forwarding the packets to the queues; and an inbound packet controller 275 for forwarding packets from the queues to the expander bus controller 235.

In addition, there are several multiplexers (muxes) 260 that are used to selectively route information through bridge 80A.

Figure 3:
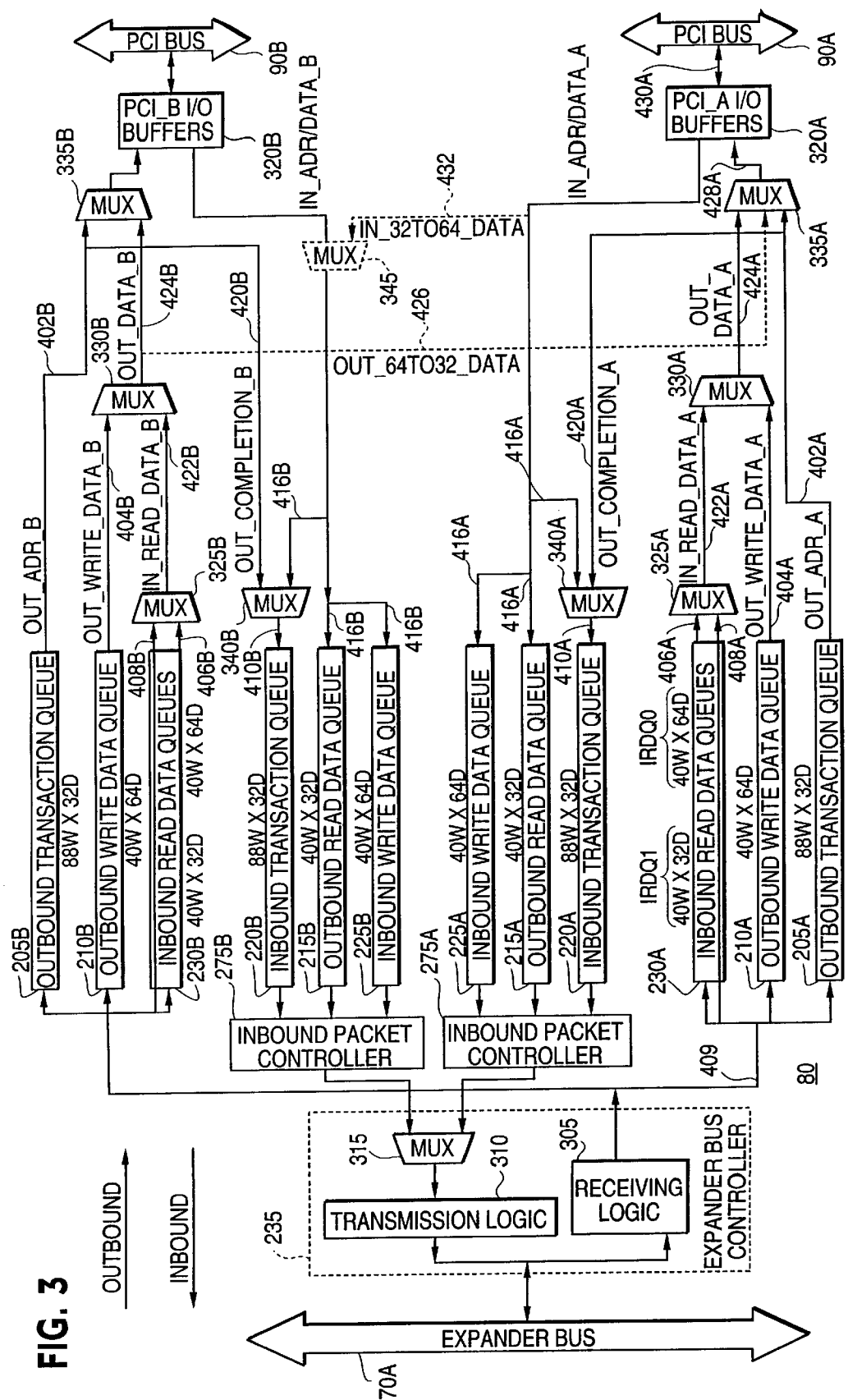
FIG. 3 is a block diagram which illustrates further details of the bus expander bridge of FIG. 2 according to an embodiment of the present invention.

FIG. 3 is a block diagram which illustrates further details of the bus expander bridge 80A of FIG. 2 according to an embodiment of the present invention. As described above for FIG. 2, the bus expander bridge 80A is split into two substantially identical sides, the A-side and the B-side. Each side includes a full set of queues (described above) and six controllers.

As illustrated in FIG. 3, expander bus controller 235 includes receiving logic 305 for receiving expander bus packets from expander bus 70A and transmission logic 310 for transmitting expander bus packets onto expander bus 70. Expander bus controller 235 also includes a mux 315 connected to the input of transmission logic 310 for selecting information from either inbound packet controller 275A or inbound packet controller 275B.

The following description (in the next two paragraphs) generally applies to each side (both A-side and B-side) of the bridge 80A, except where A-side or B-side is specifically noted. Only the dashed lines (lines 426 and 432) and the dashed mux 345 are not duplicated on both sides of the bridge 80A. The dashed lines or dashed data paths (lines 426 and 432) and the dashed mux 345 in FIG. 3 are provided to configure bridge 80A in the combined 64-bit mode, to be described below.

The output of receiving logic 305 is input to the OTQs 205, OWDQs 210 and IRDQs 230 on both sides via line 409. IRDQ 230 (on each side) includes two IRDQs, shown as IRDQ0 and IRDQ1. Outputs from the IRDQs 230 are input to mux 325 via lines 406 and 408. The output of mux 325 is connected via line 422 (In__Read Data__A on the A-side, In__Read Data__B on the B-side) to mux 330. The output of mux 330 is connected via line 424 (Out__Data__A on the A-side, Out__Data__B on B-side) to mux 335. The output of mux 335 is connected via line 428 to buffers 320. The buffers 320A are connected to PCI bus 90A, and buffers 320B are connected to PCI bus 90B. The output of OWDQ 210 is connected via line 404 (Out__Write__Data__A on the A-side, Out__Write__Data__B on the B-side) to mux 330. The output of OTQ 205 is connected via line 402 (Out__Adr__A for the A-side, and Out__Adr__B on the B-side) to mux 335. The output of mux 330B is connected via dashed line 426 (Out__64to32__Data) to mux 335A.

Line 416 (In__Adr/Data__A on the A-side, In__Adr/Data__B on the B-side) connects an output of buffer 320 to a mux 340, ORDQ 215, and IWDQ 225. The output of OTQ 205 (line 402) is connected to mux 340 via line 420 (Out__Completion__A or Out__Completion__B). The output of mux 340 is input via line 410 to ITQ 220. The outputs of ITQ 220, ORDQ 215 and IWDQ 225 are input to inbound packet controller 275. The outputs from inbound packet controllers 275A and 275B are input to mux 315.

Mux 345 is provided on the B-side and receives as inputs, an output of buffer 320B (In__Adr/Data__B) and the output from buffer 320A (In__Adr/Data__A) via dashed line 432 (In__32to64__Data). Line 416B is the output from mux 345.

The operation of bus expander bridge 80A will now be described by describing several bus transactions. (The other bus expander bridges 80B, 80C, 80D, etc. which may be connected to MIOC 100 can each be separately configured in either independent 32-bit mode or combined 64-bit mode, and each operates in the same manner as bus expander bridge 80A.)

The Bus Expander Bridge in Independent 32-Bit Mode

Only transactions for the A-side of the bus expander bridge 80A will be discussed. However, the B-side of the bus expander bridge is symmetric and operates in the same manner as the A-side when bridge 80A is in 32 bit mode.

1. 32-Bit Mode Expander Bridge: Inbound Read (e.g., a read from a PCI master to memory subsystem 110)

For an inbound read operation, a PCI device issues a PCI read transaction. The PCI read transaction is received by buffers 320A and passed to the target bus controller 255A. Target bus controller 255A determines that the read transaction is valid, decodes the destination of the read transaction, and then passes the address and destination information to the inbound transaction controller 245A (there is no data in a read request packet). The inbound transaction controller 245A generates control information that includes a transaction ID, and routing information that indicates which PCI side (A-side or B-side) the packet came from. Inbound transaction controller 245A formats the control and address information (the read request packet) into an expander bus packet and outputs this address and control information onto line 416A to store this address and control information in the ITQ 220A via mux 340A.

Inbound transaction controller 245A generates an ITQEnableA signal to enable ITQ 220A to store the control and address information of this read request packet that has been placed on line 416A. As a result, although ORDQ 215A and IWDQ 225A are also connected to line 416A, ORDQ 215A and IWDQ 225A remain disabled at this time and therefore do not store the address and control information for the packet that is output onto line 416A. (In independent 32-bit mode, inbound transaction controller 245B can independently generate an ITQEnableB signal to enable ITQ 220B). The expander bus controller 235 then outputs the read request packet to the MIOC 100 via expander bus 70A.

When the requested data becomes available from memory subsystem 110, MIOC 100 generates a completion packet that includes the requested data and the read completion (control information such as the routing information and transaction ID), and sends the completion packet to bus expander bridge 80A via expander bus 70A.

Expander bus controller 235 examines the control information (specifically the routing information) of the completion packet to determine whether this packet is directed to the PCI A-side or B-side. Completion packets are directed to the same side from which the request originated. Expander bus controller 235 first outputs the control information (including a transaction ID) of the completion packet onto line 409. At this time, if the packet is directed to the A-side, controller 235 generates an OTQEnableA signal to enable the OTQ 205A (A-side) to store the control information in OTQ 205A that is driven onto line 409. Likewise, if the packet is directed to the B-side, controller 235 generates an OTQEnableB signal to allow the control information to be stored in the OTQ 205B (B-side). This example assumes that the request packet originates from the A-side, and therefore, the completion packet is directed back to the A-side.

Next, expansion bus controller 235 outputs the requested data onto line 409 to store the data in one of two inbound read data queues (IRDQ0 or IRDQ1) on the side which the packet is directed. OTQ 205A can store up to two read completions (address and control information for two different read completions, including the transaction ID, the number of Dwords, routing information, etc.). The corresponding data for each read completion is stored in one of the two IRDQs 230A (IRDQ0 and IRDQ1). According to one embodiment, IRDQ0 can store up to 64 Dwords, and IRDQ1 can store up to 32 Dwords. A control signal (either IRDQ0EnableA or IRDQ1EnableA) is generated by controller 235 to enable one of the IRDQs 230A to store the requested data. Likewise, one of the control signals (IRDQ0EnableB or IRDQ1EnableB) is generated for the B-side IRDQs if the packet is directed to the B-side.

The outbound transaction controller 240A reads the OTQ 205A and detects the inbound read completion packet. The outbound transaction controller 240A forwards the inbound read completion packet to the inbound transaction controller 245A, which decodes the transaction ID to determine which read request the data belongs to. When the bus expander bridge 80A receives a repeated read request from the PCI master for this transaction (e.g., having the same address and other control information as the original transaction), the inbound transaction controller 245A outputs the requested data (shown as In_Read_Data_A) from either IRDQ0 or IRDQ1 230A onto PCI bus 90A via muxes 325A, 330A and 335A. The inbound transaction controller 245A controls mux 325A to selectively output the data stored in either IRDQ0 or IRDQ1, and the target bus controller 255A controls muxes 330A and 335A. IRDQ0 can store up to 64 Dwords (for example), and IRDQ1 can store up to 32 Dwords. Each of the Dwords for a read completion are output to the PCI bus 90A on successive clock cycles until all the data from the particular IRDQ is output or until the transaction is terminated by the PCI master.

2. 32-Bit Mode Expander Bridge: Inbound Write (e.g., a write from a PCI master to memory subsystem 110).

The address and data signals on the expansion bus 70 are multiplexed. Likewise, the address and data signals on the PCI buses 90A and 90B are also multiplexed. For an inbound write, the PCI master provides the address and control information, and then provides the data to be written. This information is received by the expander bus bridge 80A on bus 90A over successive clock cycles. The address and control information of a PCI write transaction is received first at PCI buffer 320A and passed to the target bus controller 255A. Target bus controller 255A determines that the write transaction is valid, and then decodes the destination of the write transaction and then passes the address and destination information to the inbound transaction controller 245A. Inbound transaction controller 245A generates control information that includes the source and destination and formats the address and control information into a expander bus packet format and outputs the address and control information (shown as In_Adr_A) onto line 416A to store this address and control information in the ITQ 220A via mux 340A by generating ITQEnableA signal.

Next, the data of the PCI write transaction is received from the PCI master. The inbound transaction controller 245A formats the data, and then stores the data in IWDQ 225A by outputting the data onto line 416A and by generating a IWDQEnableA signal to enable the IWDQ 225A. (In independent 32-bit mode and in combined 64-bit mode, the inbound transaction controller 245B can independently generate a IWDQEnableB signal to enable IWDQ 225B).

The expander bus controller 235 outputs the address and control information from ITQ 220A, and then outputs the data from IWDQ 225A for transmission to MIOC 100 over expander bus 70A. After the data has been written to memory subsystem 110, a completion packet is received by expander bus controller 235 from MIOC 100.

3. 32-Bit Mode Expander Bridge: Outbound Read (e.g., a read from a processor 10 to a PCI target).

For an outbound read, a read request packet is received by expander bus controller 235 from the MIOC 100. Controller 235 examines the packet header (address and control information) to determine if the packet is directed to PCI A-side or side B. The address and control information is then routed to the OTQ on the proper side. This example assumes that the packet is directed to PCI A-side (bus 90A). The expander bus controller 235 generates an OTQEnableA signal to enable OTQ 205A to store this address and control information in OTQ 205A. The outbound transaction controller 240A also formats the address and control information in PCI format. After expander bus bridge 80A obtains ownership of PCI bus 90A, master bus controller 250A then outputs the address and control information from OTQ 205A to bus 90A via line 402A (shown as Out_Adr_A), mux 335 and buffers 320A. A portion of the address and control information is also routed via line 420A (Out_Completion_ A) and stored in the outbound transaction controller 240A. The expander bus bridge 80A then outputs the address and control information onto the bus 90A.

The PCI target then provides the requested data onto the bus 90A. The outbound transaction controller 240A then stores the requested data in ORDQ 215A via line 416A by generating an ORDQEnableA signal to enable ORDQ 215A. Enabling ORDQ 215A allows ORDQ 215A to store the data provided on line 416A. (In independent 32-bit mode and combined 64-bit mode, outbound transaction controller 240B can independently generate an ORDQEnableB signal to enable ORDQ 215B). After all the data is received, the outbound transaction controller 240A generates and stores a read completion packet (control and address information, including transaction ID and number of Dwords) in the ITQ 220A via line 420A and mux 340A. An ITQEnableA signal is generated to enable ITQ 220A to store the completion packet (address and control information). The completion packet is shown on line 420A as Out_Completion_A. The expander bus controller 235 outputs the completion packet (address and control information) onto the expander bus 70A from ITQ 220A, and then outputs the requested data from ORDQ 215A.

4. 32-Bit Mode Expander Bridge: Outbound Write (e.g., a write from a processor 10 to a PCI target).

For an outbound write, a write request packet is received by expander bus controller 235 from the MIOC 100. Controller 235 examines the packet header (address and control information) to determine if it is directed to PCI A-side or side B. (This example assumes that the packet is directed to A-side). The address and control information is then routed to the OTQ on the proper side by outputting the address and control information onto line 409. This example assumes that the packet is directed to PCI A-side (bus 90A). The expander bus controller 235 generates an OTQEnableA signal to enable OTQ 205A to store this address and control information in OTQ 205A. Next controller 235 outputs the data onto line 409 and generates an OWDQEnableA signal to enable the OWDQ 210A to store the data. After expander bus bridge 80A obtains ownership of PCI bus 90A, master bus controller 250A then outputs the address and control information from OTQ 205A to bus 90A via line 402A (shown as Out_Adr_A), mux 335 and buffers 320A. A portion of the address and control information (including transaction ID, address and number of Dwords) is also routed via line 420A (Out_Completion_A) and stored in the outbound transaction controller 240A. The data is then output from OWDQ 210A to bus 90A via line 404A (shown as Out_write_Data_A), mux 330A, line 424A (data shown as Out_Data_A) mux 335A and buffers 320A.

Using the PCI interface over bus 90A, the PCI target then notifies the bus expander bridge 80A that the data has been written to the PCI target. The outbound transaction controller 240A generates and stores a write completion packet (control and address information, including transaction ID, address and number of Dwords) in the ITQ 220A via line 420A and mux 340A, and by generating an ITQEnableA signal to enable ITQ 220A. The completion packet is shown on line 420A as Out_Completion_A. The expander bus controller 235 outputs the completion packet (address and control information) onto the expander bus 70A from ITQ 220A.

The B-side of the bus expander bridge 80A operates in a similar manner as that described above for A-side when the bridge 80A is in the independent 32-bit mode. The A-side and the B-side of the bus expander bridge 80A can operate simultaneously, with expander bus controller 235 handling packets from both sides of bridge 80A. As shown in FIG. 1, there may be several bus expander bridges 80 (bridges 80A, 80B, . . . ) connected to MIOC 100. Each of the expander bridges 80 operate in parallel and each can be configured to operate in either independent (or multiple) 32-bit mode, or a combined 64-bit mode.

The Bus Expander Bridge in Combined 64-Bit Mode

The bus expander bridge 80A can be configured to operate in a combined 64-bit mode in which the two 32-bit PCI buses 90A and 90B are combined to provide a single 64-bit PCI bus. Likewise, more than two external buses (e.g., PCI or other buses) can be connected to a bus expander bridge 80 and combined to provide an external bus having even greater bandwidth. For example, three 32-bit external buses can be combined to provide an external 96-bit bus.

A 64-bit mode pin on the bus expander bridge 80A can be used to configure the bus expander bridge in 64-bit mode. Other techniques can also be used to select the 64-bit mode. While in combined 64-bit mode, the bus expander bridge 80A can communicate over the 64-bit PCI bus to a 64-bit PCI device (a PCI device that can provide/accept two Dwords or 64 bits of data at a time), or to a 32-bit PCI device (a PCI device capable of providing or accepting data only 32 bits at a time). When a 64-bit bus expander bridge 80A is communicating to a 32 bit PCI device, only half of the available bandwidth for bridge 80A is used.

According to an embodiment of the present invention, the bus expander bridge 80A uses the two PCI sides (A-side and B-side) in an "even-odd" scheme while in 64-bit mode. In this even-odd scheme, all even addressed data (where address[2] is 0) is placed in the queues on the A-side of the bridge 80A, and all odd addressed data (where address[2] is 1) is placed in the data queues on the B-side of bridge 80A. This scheme also lends itself to working with the 64-bit PCI specification, which requires that all even addressed data be placed in the lower 32 bits (the A-side) and all odd addressed data be placed in the upper 32 bits (B-side). While the bus expander bridge 80A is in 64-bit mode and communicating with a 32 bit PCI device, all odd addressed data is routed to PCI A-side.

According to an embodiment of the present invention, the queues (including the transaction and data queues) and the controllers on both the A-side and the B-side of bridge 80A operate in parallel when bridge 80A is in the combined 64-bit mode.

However, according to another embodiment of the bus expander bridge 80A of the present invention, while in the combined 64-bit mode, only the controllers on the A-side of bridge 80A are used, while all controllers on the B-side are reset (unused), and only the transaction queues on the A-side are used, while the transaction queues on the B-side are disabled. Additional details are described below regarding this embodiment of the present invention.

Therefore, according to an embodiment of the present invention, selecting the 64-bit mode disables all B-side controllers (outbound transaction controller 240B, inbound transaction controller 245B, master bus controller 250B, target bus controller 255B and packet controllers 270B and 275B), and all B-side transaction queues (OTQ 205B and ITQ 220B). For example, the transaction queues on the B-side can be disabled in 64-bit mode by not generating the enable signals for the B-side transaction queues. As a result, the transaction queues on the A-side (OTQ 205A and ITQ 220A) should be sufficiently large to accomodate the additional transactions (from both A-side and B-side). Thus, the transaction queues on the A-side can be made, for example, twice as large (or deep) as those on the B-side to accommodate this even-odd scheme while in 64-bit mode.

This even-odd scheme in which the B-side controllers and the B-side transaction queues in the bus expander bridge 80A are disabled in 64-bit mode provides a significant savings in the number of 32-bit data paths routed between the two sides, and reduces the number and complexity of the required circuits as compared to fully operating both sides of the bridge 80A in parallel in 64-bit mode.

The operation of bus expander bridge 80A for combined 64-bit mode will now be described. To avoid repetition, only the differences between the 64-bit mode operations and the independent 32-bit mode operations are discussed in detail.

1. 64-Bit Mode Expander Bridge: Inbound Read From 32-Bit PCI Master

The PCI read transaction (including address and control information) is always issued from the PCI master to the bus expander bridge 80A on the PCI A-side (over bus 90A) (regardless whether the read transaction comes from a 32-bit or 64-bit master). The inbound transaction controller 245A receives the address and control information and formats this information into an expander bus packet. The expander bus packet is then output onto line 416A to store this address and control information in the ITQ 220A via mux 340A. The expander bus controller then outputs the packet to the MIOC 100. After the data is read from memory subsystem 110, the completion packet (including data) is provided to the expander bus controller 235 via bus 70A. The address and control information of the read completion packet is always stored in OTQ 205A (A-side) (the controllers and ITQs on B-side are disabled). However, the data is stored in IRDQ0 or IRDQ1 230A (A-side) if the data is even addressed, and stored in IRDQ0/IRDQ1 230B (B-side) if the data is odd addressed.

When the bus expander bridge 80A receives a repeated PCI read transaction (having the same address and other control information as the original PCI read transaction) from the PCI master, the even addressed data on the A-side and the odd addressed data on the B-side are output to PCI bus 90A (A-side). The even addressed data stored on the A-side IRDQs 230A is output from IRDQ0/IRDQ1 230A via mux 325A, mux 330A and mux 335A. The odd addressed data stored in the B-side IRDQs 230B is output from IRDQ0/IRDQ1 230B, through mux 325B and mux 330B as Out_64to32_Data along line 426 to mux 335A. Mux 335A then selects the B-side data if the address is odd. The data is alternated from both sides until all data is output or until the PCI transaction is terminated by the PCI master.

2. 64-Bit Mode Expander Bridge: Inbound Read From 64-Bit PCI Master

After the data is read from memory subsystem 110, the completion packet (including data) is provided to the expander bus controller 235 via bus 70A. The address and control information of the read completion packet is always stored in OTQ 205A (A-side) (the controllers and ITQs on B-side are disabled). However, the data is stored in IRDQ0 or IRDQ1 230A (A-side) if the data is even addressed, and stored in IRDQ0/IRDQ1 230B (B-side) if the data is odd addressed. For a 64-bit master, the first address is always an even address.

When the bus expander bridge 80A receives a repeated read request (having the same address and command as the original read request) from the PCI master, the even addressed data (stored in IRDQs on A-side) is output to PCI A-side (bus 90A), and the odd addressed data (stored in IRDQs on B-side) is output to PCI B-side (bus 90B). The inbound transaction controller on the A-side (245A) repeatedly outputs two double words in parallel from IRDQs on both sides until all data have been output or until the PCI read transaction is terminated by the PCI master. By outputting a Dword from the A-side in parallel with a Dword from the B-side, a 64 bit PCI bus is provided.

3. 64-Bit Mode Expander Bridge: Inbound Write From 32-Bit PCI Master

A PCI write transaction is issued by the PCI master. The inbound transaction controller 245A (A-side) formats the address and control information into expander bus format and stores the address and control information in the ITQ 220A (A-side). The data arrives only on the PCI A-side (only over bus 90A). The bus expander bridge 80A is notified by the PCI master via PCI protocol that the PCI master is only a 32-bit device, and therefore, the expander bridge expects the data only on the PCI A-side.

The inbound transaction controller 245A (A-side) examines the first address of the write request packet. If the first address is even, then the data of the first Dword is stored in IWDQ 225A (A-side) via line 416A. If the first address is odd, then the first Dword is stored in IWDQ 225B via line 432 (shown as In_32to64_Data), mux 345 and line 416B. Subsequent Dwords are stored in IWDQs in alternate sides. The inbound transaction controller 245A (A-side) formats and stores the address and control information for the write request packet in the ITQ 220A (A-side) (controllers and transaction queues on B-side are disabled). The address and control information are then output by the expander bus controller 235 to the MIOC 100 as part of the write request packet.

The controller 235 then outputs the data to the MIOC 100. To identify the location (A-side or B-side) of the first Dword, the inbound packet controller examines the address information of the packet. The even or odd address of the first Dword indicates that the first Dword is located on the A-side or B-side, respectively. The first Dword is output from the A-side AITCHES if the first address is even, and obtains the first Dword from the B-side AITCHES if the first address is odd. Controller 235 outputs the data from the AITCHES, alternating from each side, beginning with the first Dword. After writing the data, the write completion packet (address and control information) is received from the MIOC 100.

4. 64-Bit Mode Expander Bridge: Inbound Write From 64-Bit PCI Master

In this case, the bus expander bridge 80A is notified via PCI protocol by the PCI master that the PCI master is a 64-bit PCI device (can send data 64 bits at a time over buses 90A and 90B). Therefore, the data for the write request packet is received over both PCI sides (over both PCI buses 90A and 90B) at the same time. The address and control information for the write request packet is stored only in the ITQ 220A (A-side) (B-side controllers and transaction queues are disabled). The data received over the A-side PCI bus is always even addressed and is stored in the IWDQ 225A (A-side), and the data received over the B-side PCI bus (90B) is always odd addressed and is stored in the IWDQ 225B (B-side). The even addressed Dword is the lower 32 bits of data. Therefore, (for a 64-bit master) the expander bus controller 235 outputs the write data to the MIOC 100 always beginning with the A-side AITCHES.

5. 64-Bit Mode Expander Bridge: Outbound Write

A write request packet is received by controller 235 from the MIOC 100. The address and control information of the write request packet is stored in the OTQ 205A (A-side), regardless whether the PCI target is a 32-bit target or a 64-bit target because transaction queues on the B-side are disabled when the bus expander bridge 80A is in independent 64-bit mode. The even addressed data is placed in the OWDQ 210A (A-side), and the odd addressed data is placed in the OWDQ 210B (B-side). At this point the expander bus bridge 80 is not aware whether the PCI target is a 32-bit or a 64-bit target. The master bus controller 250A (A-side) uses PCI protocols to determine whether the PCI target is a 32-bit target or a 64-bit target. This can be achieved, for example, by the master bus controller 250A issuing a Reg64 signal to inform the PCI target that it is 64-bit capable. The PCI target can respond with a DevSel (device select) signal and can also respond with an Ack64 signal to indicate that it is 64-bit capable. If the Master bus controller receives DevSel back but no Ack64, then the master bus controller 250A knows that the PCI target is a 32-bit target. If master bus controller receives an Ack64 signal, then it knows that the PCI target is a 64-bit PCI target.

If the PCI target is a 64-bit target, the data stored in the A-side is output onto PCI A-side bus 90A, and simultaneously, the data stored in the B-side is output onto the PCI B-side bus 90B to provide a 64 bit data path. On the other hand, if the PCI target is a 32-bit target, the data stored in both the A-side and the B-side of the bridge 80A are alternately output to the PCI A-side bus 90A, beginning with the side of the first address. For a 32-bit target, the B-side data is output from OWDQ 210B, through mux 330B, line 426 as Out_64to32_Data to mux 335A. Mux 335A alternately selects either the A-side data (Out_Data_A over line 424A) or the B-side data (Out_64to32_Data over line 426).

6. 64-Bit Mode Expander Bridge: Outbound Read

The read request packet is received from the MIOC 100. The control and address information is stored in the OTQ 220A (there is no data in a read request packet).

The master bus controller then uses the PCI protocols to determine whether the PCI target is a 32-bit target or a 64-bit target. The read request packet is then output to the PCI target over the PCI A-side bus 90A.

If the PCI target is 64-bit capable, the requested data is output from the PCI target to the bus expander bridge 80A over both PCI buses 90A (for even addressed data) and 90B (for odd addressed data) and stored in ORDQs 215A (A-side) and 215B (B-side), respectively.

If the PCI target is a 32-bit target, the requested data is provided only over the A-side PCI bus 90A to the bus expander bridge 80A. If the starting address is even, the first Dword is stored in the ORDQ 215A (A-side). If the starting address is odd, then the first Dword is stored in the ORDQ 215B (B-side). The Dwords are alternately stored in the different sides of bridge 80A. For the completion packet, the expander bus controller outputs Dwords from alternate sides. If the first address is even, the first Dword is output from the A-side. If the first address is odd, the first Dword is output from the B-side.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An apparatus for interfacing first and second buses to a third bus, said apparatus being configurable in either an independent mode in which the first and second buses operate independently and a combined mode in which the first and second buses are combined to create a single bus, comprising:

a first set of data queues for routing data between the first bus and the third bus;

a second set of data queues for routing data between the second bus and the third bus;

a controller coupled to the first and second sets of data queues and operating the first and second sets of data queues in parallel for the independent mode;

said controller routing even addressed data through the first set of data queues and routing odd addressed data through the second set of data queues for the combined mode;

said controller comprising a first controller controlling operation of the first set of data queues, and a second controller controlling operation of the second set of data queues, wherein said second controller is disabled and the first controller controls both the first and second sets of data queues during said combined mode.

2. An apparatus for interfacing first and second buses to a third bus, said apparatus being configurable in either an independent mode in which the first and second buses operate independently and a combined mode in which the first and second buses are combined to create a single bus, comprising:

a first set of data queues for routing data between the first bus and the third bus;

a second set of data queues for routing data between the second bus and the third bus;

a controller coupled to the first and second sets of data queues and operating the first and second sets of data queues in parallel for the independent mode;

said controller routing even addressed data through the first set of data queues and routing odd addressed data through the second set of data queues for the combined mode;

a first set of transaction queues for routing address and control information between the first bus and the third bus;

a second set of transaction queues for routing address and control information between the second bus and the third bus;

said controller coupled to the first and second sets of transaction queues and operating the first and second sets of transaction queues in parallel for the independent mode; and said controller routing address and control information through only one of the sets of transaction queues for the combined mode.

3. The apparatus of claim 2 wherein said controller routes address and control information through only the first set of transaction queues and the second set of transaction queues are disabled for the combined mode.

4. An apparatus for interfacing first and second buses to a third bus, said apparatus being configurable in either an independent mode in which the first and second buses operate independently and a combined mode in which the first and second buses are combined to create a single bus, comprising:

a first set of data queues for routing data between the first bus and the third bus;

a second set of data queues for routing data between the second bus and the third bus;

a controller coupled to the first and second sets of data queues and operating the first and second sets of data queues in parallel for the independent mode;

said controller routing even addressed data through the first set of data queues and routing odd addressed data through the second set of data queues for the combined mode;

wherein said first and second buses comprise first and second 32-bit PCI buses that operate independently in the independent mode, and wherein the first and second 32-bit PCI buses are combined in the combined mode to create a single 64-bit PCI bus.

5. A computer system comprising:

a host processor coupled to a host bus;

a bridge controller coupled to the host bus;

a bus bridge coupled to the bridge controller and at least first and second external buses, the bus bridge being configurable in either an independent mode in which the first and second external buses operate independently and a combined mode in which the first and second external buses are combined to create a single bus; and wherein said bus bridge comprises:

a first set of data queues for routing data between the first external bus and the bridge controller;

a second set of data queues for routing data between the second external bus and the bridge controller;

a controller coupled to the first and second sets of data queues and operating the first and second sets of data queues in parallel for the independent mode; and said controller routing even addressed data through the first set of data queues and routing odd addressed data through the second set of data queues for the combined mode.

6. The computer system of claim 5 wherein said bus bridge further comprises:

a first set of transaction queues for routing address and control information between the first external bus and the Bridge controller;

a second set of transaction queues for routing address and control information between the second external bus and the bridge controller;

said controller coupled to the first and second sets of transaction queues and operating the first and second sets of transaction queues in parallel for the independent mode; and said controller routing address and control information through only one of the sets of transaction queues for the combined mode.

7. An apparatus for interfacing between first and second external buses to a third bus, said apparatus being configurable in either an independent mode in which the first and second external buses operate independently and a combined mode in which the first and second buses are combined to create a single bus, comprising:

a first set of data queues for routing data between the first external bus and the third bus;

a second set of data queues for routing data between the second external bus and the third bus;

means for operating the first and second sets of data queues in parallel for the independent mode;

means for routing even addressed data through the first set of data queues and for routing odd addressed data through the second set of data queues for the combined mode;

a first controller for controlling operation of the first set of data queues;

a second controller for controlling operation of the second set of data queues; and wherein one of the first and second controllers is disabled and a remaining one of the first and second controllers controls both the first and second sets of data queues in the combined mode.

* * * * *